July 31, 1934. E. F. GOODYEAR ET AL 1,968,076
AEROPLANE WHEEL
Filed May 4, 1933
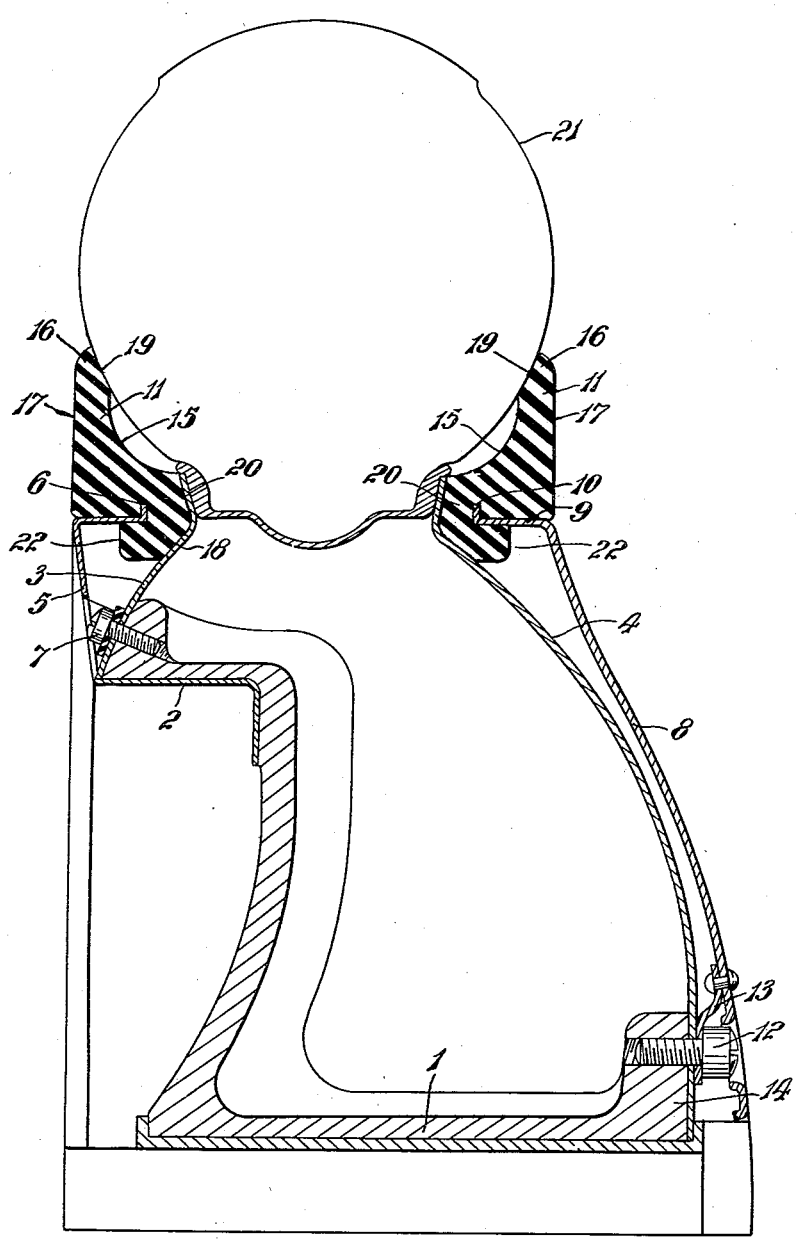
INVENTORS
Ernest Frederick Goodyear
Joseph Wright
by Elsina & Rauber
Attorneys

UNITED STATES PATENT OFFICE 1,968,076

AEROPLANE WHEEL

Ernest Frederick Goodyear, Moxhall Park, Wishaw, and Joseph Wright, Stoke Park, Coventry, England, assignors to Dunlop Rubber Company Limited, Fort Dunlop, England, a British corporation Application May 4, 1933, Serial No. 669,295
In Great Britain June 21, 1932

9 Claims. (Cl. 301—37)

This invention concerns improvements in or relating to wheels and fairings for use on aeroplanes.

The main object of the present invention is to provide a fairing which is positioned by its own resilience and in which weight is reduced to the minimum, not only by the employment of light weight material but also by obviating the securing means commonly employed hitherto.

The invention is also characterized by the improved facility with which the resilient portion of the fairing may be dismantled to permit of the removal or replacement of the tire and with a corresponding facility in re-assembling the fairing upon its support and in the improved degree of security attained in the manner in which the removable portion is clamped in position.

According to this invention, we provide a fairing for aeroplane wheels in which a resilient annulus is detachably positioned on a support by contraction upon a flange projecting from the support independently of other securing means, preferably in which the annulus is formed with a recess in which the flange projecting from the support is seated, the support consisting of a centrally apertured disc, the periphery of which is flanged axially inwards and in which the edge of the support terminates in a radially extending toe, the inner diameter of the annulus being less than that of the support when removed therefrom.

In order that the invention may be more easily understood and readily carried into effect, the same will now be described with reference to the accompanying drawing, in which the drawing shows a part sectional elevation of the invention as applied to an aeroplane wheel.

The invention is shown applied to a wheel consisting of a hub 1 and brake drum 2 which may be cast in one piece of light weight metal, the outer periphery or edge of the brakedrum being connected by a load supporting disc 3 to one side of the rim, and on the opposite side by a load supporting disc 4 extending from the rim to the hub.

The rim however, may be supported from the hub by compression or tension spokes or by either of these in combination with discs.

On the inner side of the wheel adjacent the vehicle is a ring 5, the inner edge of which is radially flanged at 6, the ring being secured to the brakedrum by a number of set screws 7, passing through suitable brackets riveted to the under surface of the ring.

On the opposite or outer side is a non-load supporting fairing disc 8, the periphery of which is flanged axially inwards at 9 and radially outwards at 10 to support one of a pair of interchangeable contractile rings 11.

The metal disc portion 8 of the fairing extends from the rim to the wheel centre, where it may be secured to the hub by bolts 12, the heads of which lie within recesses and engage an internal collar 13, riveted to the inner side of the disc, the stems of the bolts passing through the load supporting disc and threading into a flange 14 on the hub.

The contractile rings, which are supported on the cylindrical surfaces formed on the outer peripheries of the ring 5 and discs 8, are of substantially triangular cross section and of flexible, resilient material such as rubber, the internal profile 15 of each ring being approximately semi-circular and of less curvature than that of the adjacent tire wall, so as to reduce chafing and unnecessary weight and to permit them the more readily to conform to the distortion of the tire.

One of these rings is provided on each side of the rim, the outer surface of the toe portion or apex 16 of each ring being rounded, the inner surface being concave at 19 to bear against the wall of the tire 21.

The outer side 17 of each ring is substantially flat, as is also the base portion with the exception of an annular recess or groove which interlocks owing to the elasticity of the ring with the radially extending flanges 6 and 10 on the metal parts of the fairings. The inner side 18 of the lower portion of each ring is of concave formation complementary to the outer surfaces of the load supporting discs and is preferably terminated in an outwardly extending toe portion 22, the under side of which is extended downwardly to bear against the upper part of the load supporting disc.

The tire carrying rim is thus separated from the more rigid metal parts of the fairings with an intervening portion 20 of yielding material, which not only eliminates any metal to metal contact noises between rim and fairing, but also forms a neck which is clamped between these parts, thus ensuring permanence of attachment.

The metallic portions of the fairings are positively supported in each case at their inner peripheries only so that although they are sufficiently rigid to clamp the contractile rings in position, there is some slight degree of yielding movement at their outer edges which facilitates the removal of the rubber portions positioned upon their peripheries.

The contractile rings are moulded of slightly smaller diameter than the disc so that when stretched on they are self-locking upon the supports 5 and 9 on each side without other fastening being required, and thus the rings may be quickly interchanged or detached to permit of replacement or to permit of tire inspection or replacement.

Having now particularly described and ascertained the nature of our said invention and in what manner the same is to be performed, we declare that what we claim is:—

1. A fairing member for wheels comprising a disc having means to secure it centrally to a wheel structure and extending sidewise near its periphery and then radially outwardly in a narrow radial flange, and a ring of extensible resilient material mounted on and receiving said sidewise extension and having tire and rim receiving surfaces.

2. A fairing for wheels which comprises an annular disc to extend from a hub to a rim, having means at its inner edge for mounting on a hub, and a ring of resilient material mounted on its outer edge and having surfaces to bear on the rim and on a tire.

3. A fairing for wheels comprising a disc to span the space within a rim of a wheel, and having means to secure said disc to a hub, and having a ring of resilient material mounted on the outer edge of the disc, said ring having surfaces to bear on the rim and on a tire.

4. A fairing for a wheel comprising an annular disc to extend from the hub to the rim of said wheel, means to secure said fairing to the hub, a ring of extensible material between said disc and said rim and having an annular recess extending axially toward said rim and then radially outwardly, and an extension on said disc extending into said recess to hold said ring between said disc and the rim of the wheel.

5. A fairing for wheels comprising an annular disc to span the space from hub to rim and having means at its inner edge to secure it to the end portion of the hub, a ring of extensible material at the outer edge of said disc and having a surface to bear against the rim of the wheel, and having an annular recess extending axially from said disc and then radially outwardly, and an extension on said disc extending into said recess and holding said ring between the disc and the rim beyond said rim to form a tire contact surface.

6. A fairing for wheels comprising an annular disc to span the space from hub to rim and having means at its inner edge to secure it to the end portion of the hub, and a ring of extensible material at the outer edge of said disc and having a surface to bear against the rim of the wheel, and having an annular recess extending axially from said disc and then radially outwardly, an extension on said disc extending into said recess and holding said ring between the disc and the rim beyond said rim to form a tire contact surface, the outer surface of said ring extending smoothly from said disc to the tire contact surface.

7. A fairing for wheels comprising an annular disc to span the space from hub to rim and having means at its inner edge to secure it to the end portion of the hub, a ring of extensible material at the outer edge of said disc and having a surface to bear against the rim of the wheel, and having an annular recess extending axially from said disc and then radially outwardly, and an extension on said disc extending into said recess and holding said ring between the disc and the rim beyond said rim to form a tire contact surface, said tire contact surface having an annular groove of circular curvature in cross section.

8. A fairing for wheels comprising a disc, means to secure said disc near its central part to the hub of a wheel and having a seating means at its periphery, and a ring of resilient extensible material seated on and engaging said seat, and having rim and tire contact surfaces.

9. A fairing for wheels comprising a disc having centrally located means to secure said disc to the hub of a wheel and having seating means at its periphery, and a ring of resilient extensible material seated on and engaging said seating means and having rim and tire contact surfaces, said disc being dished, and the outer face of said ring forming an extension of the outer surface of said disc.

ERNEST FREDERICK GOODYEAR.
JOSEPH WRIGHT.